Oct. 18, 1932.   R. J. JENKINS   1,883,295
FUEL SAVING AND COMBUSTION REGULATING DEVICE
Filed Jan. 5, 1932   2 Sheets-Sheet 1

Inventor
R. J. JENKINS
By
Pattison Wright & Pattison
Attorneys

Oct. 18, 1932. R. J. JENKINS 1,883,295
FUEL SAVING AND COMBUSTION REGULATING DEVICE
Filed Jan. 5, 1932 2 Sheets-Sheet 2
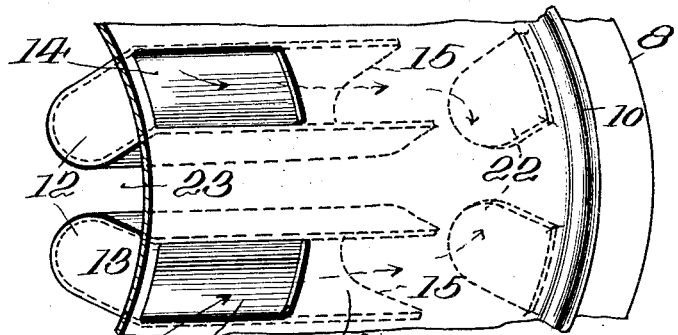
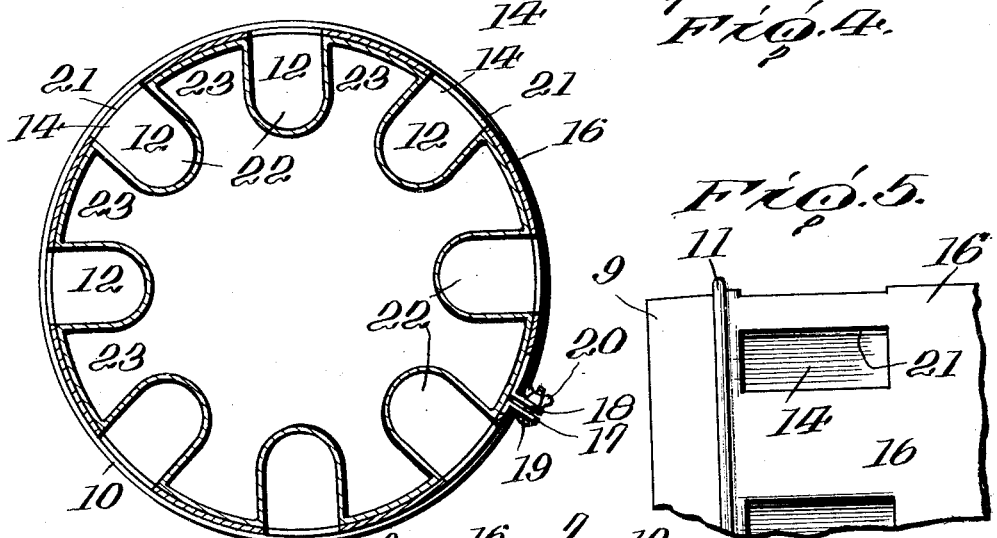
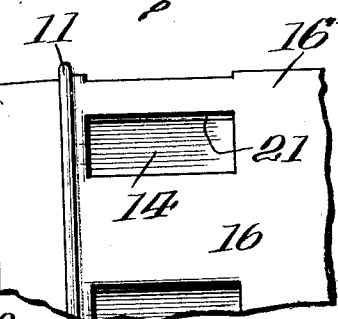
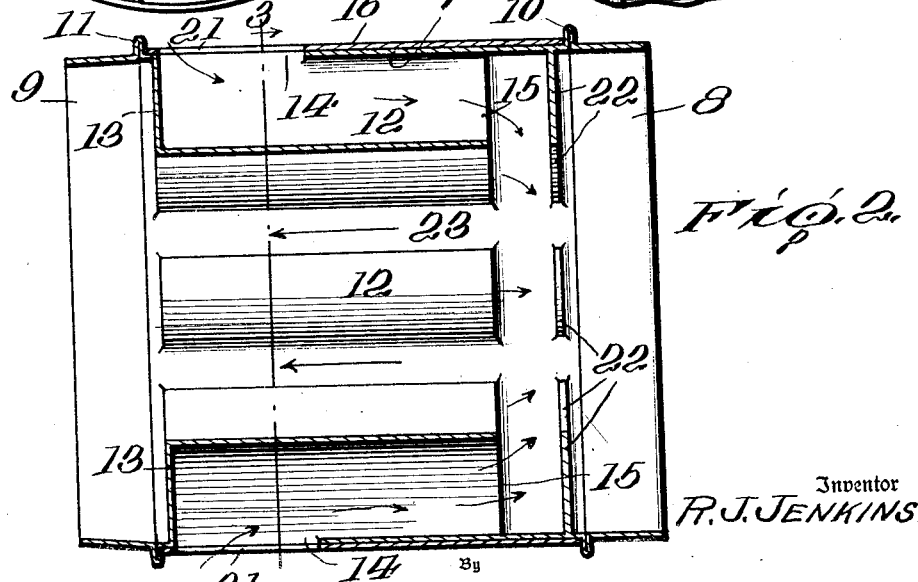
Inventor
R. J. JENKINS.

Patented Oct. 18, 1932

1,883,295

UNITED STATES PATENT OFFICE

RAYMOND J. JENKINS, OF BALTIMORE, MARYLAND

FUEL SAVING AND COMBUSTION REGULATING DEVICE

Application filed January 5, 1932. Serial No. 584,871.

This invention relates to improvements in fuel saving and combustion regulating devices of a type which is an attachment to and in the outlet flue pipes or conduits for stoves, furnaces and heating devices in general which burn coal or its equivalent as a fuel, and is a continuation in part of my copending application Serial No. 523,847 filed Mar. 19, 1931, for smoke pipe air checks.

The primary object of the invention is the provision of a fuel saving device and combustion regulator which is automatic in operation.

A further object of the invention is the provision of a device of the character described which does not lower the efficiency of the heating plant by disturbing or cooling the stack or outlet flue temperature.

A further object is the provision of a device of the character described which effects a fuel saving by effecting a perfect combustion at all times in the heating plant and thereby assuring maximum efficiency at all rates of combustion.

A still further object of the invention is the provision of a device of the character described which reduces to a minimum the discharge of smoke through the outlet of the heating plant and by said elimination increasing the efficiency of the plant and obtaining the maximum heat from all of the combustible products of the fuel.

Another and still further object of the invention is the provision of a device of the character described which is cheap of manufacture yet novel of construction and novel and highly efficient in operation.

Other specific novel features of construction and improved results of the invention will appear more particularly from the following description taken in conjunction with the accompanying drawings.

In the drawings,

Figure 2 is a longitudinal sectional view through the improved device;

Figure 3 is a transverse section view through the improved device, the view being taken on the line 3—3 of Figure 2;

Figure 4 is a fragmentary side perspective view of the improved device; and

Figure 5 is a fragmentary detail view showing the air inlet openings of the device.

Figure 1:
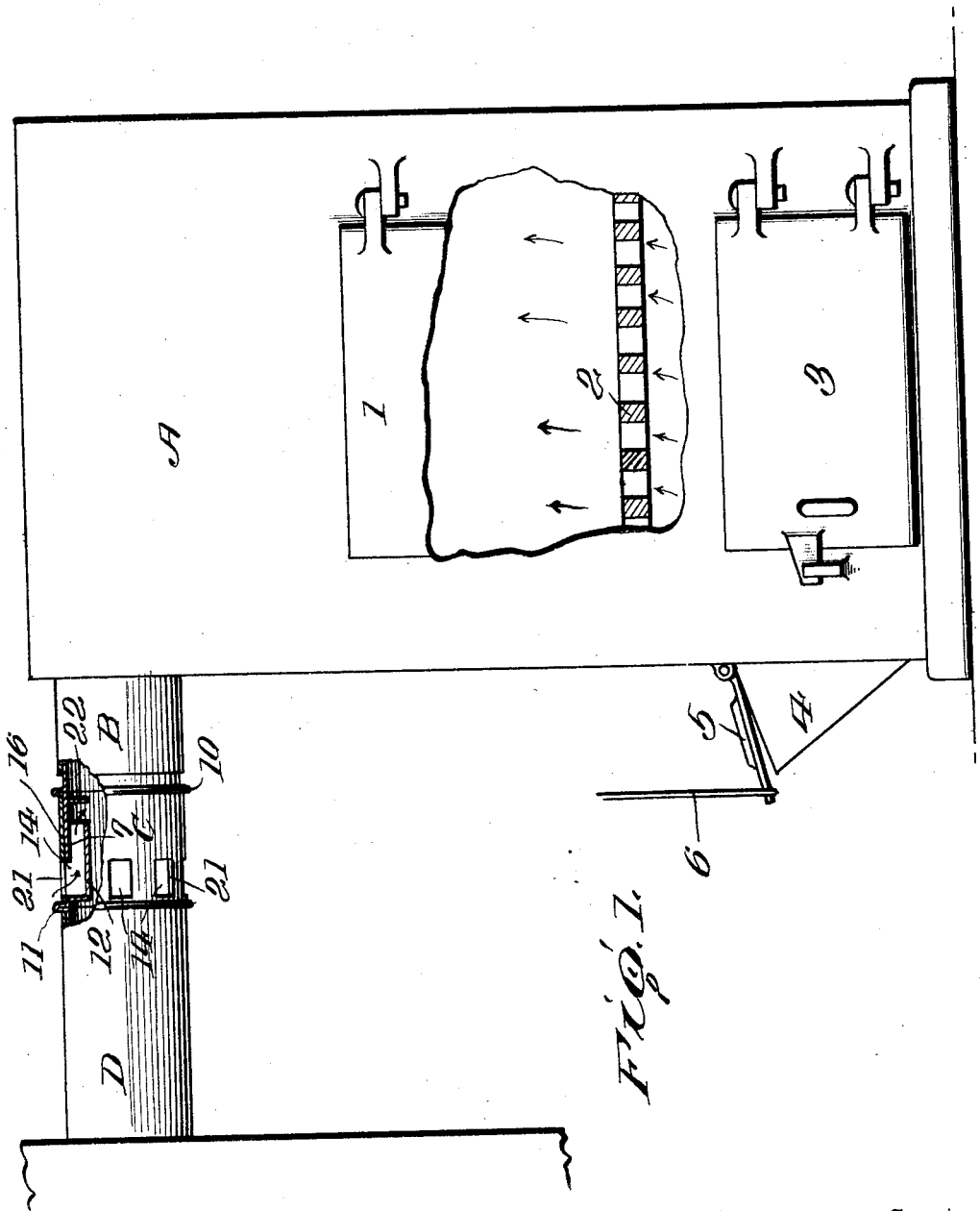
Figure 1 is a view in side elevation illustrating a domestic heating plant showing applied in the outlet flue thereof the improved invention, a portion of the heating plant and a portion of the fuel saving device being broken away and shown in section.

Referring now to the drawings in which like parts are designated by similar reference numerals throughout the description and considering Figure 1 in particular, it will be seen that A designates the heating plant in general and B the outlet flue of the heating plant adjacent the plant, C the fuel saver and automatic combustion regulator which comprises the present invention and D the continuation of the outlet flue pipe beyond the fuel saver.

The representation of the heating plant is more or less diagrammatic but in common with all heating plants, there is a door 1 to permit the feeding of fuel into the plant upon the grate 2 and there is a door 3 giving entrance to the plant below the grate for the removal of ashes and at the bottom of the plant beneath the grate there is also an air inlet 4 controlled by a damper 5 which is provided with an operating means 6.

Describing the fuel saver and combustion regulator in detail it will be seen that the same comprises a hollow body 7 of tubular form which is of a size to correspond and match the heating plant fuel outlet sections B and D and is connected to that in the usual common manner which is that of telescoping the sections and to this end the tubular body 7 is provided at its ends with collars 8 and 9 which terminate at their inner ends in circumferential beads 10 and 11.

At regular spaced intervals throughout its circumference the tubular body is pressed inwardly to form a plurality of corrugations 12 which constitute air passageways in that adjacent their upper closed ends 13 these corrugations are provided with openings 14 while their lower ends 15 are open and in communication with the interior of the tubular body. Surrounding the tubular body between the circumferential beads 10 and 11 there is positioned a split sleeve 16 which has its adjacent ends bent to form ears 17 and 18 through which pass a threaded bolt 19 carrying a thumb nut 20. This sleeve 16 is provided with a plurality of cut-out portions to form openings 21 of a number similar to the number of passageways 12 and the openings 21 are of a size similar to that of the openings 14 in the outer side walls of the air passageways 12.

This construction permits the sleeve to be rotated around the tubular body and cause the openings in the sleeve to register fully or only partially in the body to thus form what is in effect a shutter damper and through the instrumentality of this sleeve the size of the outlet openings 14 can be regulated as desired and as necessary in the proper adjustment of the fuel saver for proper and efficient operation. When once adjusted the sleeve is clamped in adjusted position by means of the thumb nut 20.

Immediately beyond the lower ends of the air passageways 12 which project inwardly into the tubular body are positioned baffle plates 22 which are of a size and shape similar to the open end of the passageways. As stated these baffle plates are immediately beyond the air passageways but are spaced away from the passageways to permit the air coming down the passageways entry into the tubular body without unduly restricting said air admission.

From the drawings it will be seen that the air passageways 12 are of a U-shape in cross section but I desire it to be understood that although I have found this shape of air passageway to be the most desirable, these air passageways need not necessarily be of this particular shape but could be of an angular shape in cross section without departing from the spirit of the invention and were such an alteration in the shape of the passageways made it would be also desirable to reshape the baffle plates 22 in accordance therewith.

The air passageways 12, as is readily apparent from the drawings, are elongated and it might be stated that for efficient operation I have found that three inches in length is a desirable length for the air conduits, but the air conduits might be made shorter than this without destroying the efficiency of the device in so long as the conduits assured that the air entering through the inlet openings 14 and discharged into the interior of the body is well warmed before it is discharged from the conduits.

In the drawings the tubular device is intended to represent a combustion control for placement in a fuel outlet pipe of an eight inch diameter and in accordance with my practices for the most efficient operation of the device there is provided eight inwardly projecting air passageways 12. I have found that for each inch in increase in diameter of the device and the fuel outlet pipe with which it is to be used that it is desirable to add one more air passageway and the same principle of construction would apply for pipes of lesser or larger diameter. As an instance, for use with a seven inch pipe the device would have seven air passageways. Thus it will be seen that there is one air passageway for each inch of diameter of the device and it should be understood that irrespective of the number of air passageways they should be spaced an equal distance apart to provide between them a plurality of unobstructed draft passageways 23 between the air inlet passageways 12.

The distance which the air passageways extend into the tubular body is of course variable. They should not extend into the pipe too far because it is necessary and highly desirable that centrally of the tubular body an unobstructed passageway for the flue gases should be provided but at the same time the air passageways should extend sufficiently far into the device to assure that they are well heated by escaping flue gases so that the heated walls of the air passageways will assure a heating of the air which is admitted to the device from the outside.

It is, of course, apparent that the baffle plates 22 are positioned in the end of the device adjacent the heating plant and that they will perform two functions. They will deflect the incoming air towards the center of the device and they will prevent the passage of soot or smoke or the tendency of the passage of soot or smoke into the air inlet passageways.

While the fire is being built, it is, as a matter of fact, desirable to adjust the shutter damper 16 so as to close the inlet openings 14 of the air passageways. When the fire is burning well and a flue temperature has been built up, the shutter damper 16 is then operated and adjusted to meet the particular conditions of the particular heating plant and type of coal fuel and when it has been once properly adjusted, the shutter should be securely clamped in adjusted position because thereafter the operation of the fuel saving device is automatic.

It is to be noted that no stack or flue outlet damper is used in connection with the heating plant when the present improved device is used because the stack draft is automatically controlled by the device as the increase or decrease of stack draft is regulated by the volume of air admitted to the stack through the air inlet conduits 12 in conjunction with the volume of air admitted through or at the grate through the manipulation of the damper 5 in respect to the air inlet opening 4 at the base of the heating plant.

The adjustment of the shutter damper 16 once the fire is in operation is made in accordance with the character of fuel being used and the strength or weakness of the stack or outlet flue draft which would of course vary in respect to every heating plant. However when these features have been once determined and the shutter damper once properly adjusted, the rate of combustion is controlled exclusively by the bottom draft or damper 5 of the heating plant.

The operation of the present device is unlike that where a damper is used in the stack or outlet flue that checks combustion by reducing the draft area with a consequent speeding up of draft pull which causes an increased stack temperature, or the type of damper that retards combustion by reducing the stack pull or draft through forcing the stack pull from the fire to a point beyond combustion with a consequent admission to the stack or outlet flue of chilled air in that the present device controls the stack or outlet flue draft by maintaining an even draft pull at all times in proportion to the admission of air into the grate or through the bottom damper of the heating plant as it will be apparent that as the draft increases in the stack this will be met by an increasing amount of air being pulled inwardly into the device and the stack through the air admission passageways 12.

Additionally the device is such that sufficient draft is assured and maintained at all times to support perfect combustion as a constant draft pull exists between the tubes or air admission passageways 12 of a volume sufficient to balance with the bottom draft.

In respect to the device it has been further found that the temperature of the stack or flue outlet pipe automatically increases or diminishes with the opening or closing of the bottom draft and that the stack is always primed, from the standpoint of heat, and ready to respond to any change which may be made in the bottom draft as the air inlet passageways 12 are sufficiently heated to properly heat the air drawn into the device through the air inlet passageways 12.

It will be seen that the present device and its method of operation is unlike the method of checking combustion through checking stack pull at a point above the fire and admitting at the same time chilled or cold air to the stack or outlet flue. The present device maintains perfect combustion at all speeds and the speed of combustion is controlled exclusively by the bottom draft but the device admits warmed air into the stack and the temperature of this air being admitted is increased or decreased as the speed of combustion increases or decreases for the reason that upon the increase in the combustion speed the air inlet tubes or passageways 12 become hotter and upon a decrease in the combustion speed the temperature of these tubes or passageways is reduced.

For proper operation the air admission passageways must be properly spaced and must be of a proper length to assure that chilled air is not admitted to the stack but that warmed air is admitted to the stack under all conditions of operation. If chilled air is permitted to enter the stack, proper balance for good combustion is destroyed. The fire in the heating plant would burn slowly but with little or no benefit and with poor efficiency. With chilled air entering into the stack, a condition would exist such as previously described in respect to other devices such as those that use an ordinary damper with an admission of cold air into the stack, and this condition the present invention overcomes by assuring that the air admitted to the stack is pre-heated.

The present device after the fire has once been built, is ready at all times for operation and automatically adjusts itself to changed conditions such as changed draft in the stack, etc.

The present device has been found particularly efficient in connection with burning of high and low volatile and semi-bituminous coal. For domestic use a fuel of this kind is not desirable because it occasions considerable care of the fire because the fire burns out so rapidly. With my present invention fuel of this kind can be burned advantageously in the home because the rate of combustion of the fuel can be absolutely controlled thus permitting the fire to be left for hours without attention. In other words the present device permits a definite control of the rate of combustion and with the rate of combustion under control of the operator the fuel can be made to burn at any speed desirable to throw off any desired amount of heat.

The device has proven however that when used in connection with any and all kinds of fuel in the nature of coal, it effects a saving of fuel by permitting the absolute control of the rate or speed of combustion, by permitting a rate of combustion proper to the type of fuel being used and by assuring that all of the volatile contents of the fuel be consumed in the heating plant including of course the gaseous combustibles of the fuel, a large portion of which ordinarily are lost in heating plants in the form of smoke escaping from the outlet flue or stack.

From the foregoing description it will be seen that I have provided a combustion regulating device comprising a hollow body having a central unobstructed flue gas passageway surrounded by a plurality of annularly spaced unobstructed draft passageways, which spaced passageways are separated by obstructions in the form of air passageways for allowing heated air to be delivered to the central flue gas passageway and the spaced passageways, whereby I admit hot air to the unobstructed draft passageways at a point of increased velocity of the flue gases passing therethrough so as to balance the draft pull of stack with the admission of air for combustion in the heating unit automatically so as to dispense with the manually operated damper in the stack.

What I claim is:

1. A smoke flue formed intermediate of its ends with longitudinal air flues on its inner wall and spaced from each other to provide unobstructed passageways for the products of combustion passing in opposite direction from the passage of air in said air flues, said air flues being closed at one end and open at the other end adjacent to the smoke inlet of the flue means adapted to discharge the air towards the axis of the flue, said air flues having air inlet openings adjacent their closed ends.

2. A smoke flue formed intermediate of its ends with longitudinal air flues on its inner wall and spaced from each other to provide unobstructed passageways for the products of combustion passing in opposite direction from the passage of air in said air flues, said air flues being closed at one end and open at the other end adjacent to the smoke inlet of the flue and adapted to discharge the air towards the axis of the flue and having air inlet openings adjacent their closed ends, with a baffle adjacent the open end of each air flue.

3. A smoke flue section adapted to be located adjacent the smoke outlet of a furnace and formed on its inner wall with longitudinal air passageways spaced from each other and arranged circumferentially to provide unobstructed passageways for the products of combustion, said air passageways being closed at one end and open at the other end adjacent the smoke inlet of the smoke flue section and having air inlets adjacent the closed end whereby the air is carried through the air passageway in an opposite direction to the passage of the products of combustion as described.

4. A device of the kind described comprising a smoke flue section formed on its inner wall with circumferentially arranged and inwardly projecting longitudinally extending air passageways spaced from each other to provide unobstructed passageways for the products of combustion, said air passageways being closed at one end and open at the other end, means for directing the air from said air pasageways towards the axis of said smoke flue section and air inlets in the wall of said smoke flue section adjacent to the closed end of said air passageways.

5. A device of the kind described comprising a smoke flue section formed on its inner wall with circumferentially arranged and inwardly projecting longitudinally extending air passageways spaced from each other to provide unobstructed passageways for the products of combustion, said air passageways being closed at one end and open at the other end, means for directing the air from said air passageways towards the axis of said smoke flue section and air inlets in the wall of said smoke flue section adjacent to the closed end of said air passageways, and means for controlling the admission of air to the air passageways.

6. A device of the kind described comprising a smoke flue section formed on its inner wall with circumferentially arranged and inwardly projecting longitudinally extending air passageways spaced from each other to provide unobstructed passageways for the products of combustion, said air passageways being closed at one end and open at the other end, means for directing the air from said air passageways towards the axis of said smoke flue section and air inlets in the wall of said smoke flue section adjacent to the closed end of said air passageways, and an annular damper controlling the admission of air through said air inlets.

7. As a new article of manufacture a smoke pipe section formed on its inner wall with circumferentially arranged longitudinal air tubes closed at one end and open at the other end, spaced from each other to form unobstructed passageways for the products of combustion, air inlets adjacent to the closed ends of the air tubes, damper means for controlling the admission of air through the air tubes and baffle plates spaced from the open ends of the air tubes to direct the air towards the axis of the smoke pipe section.

8. A device of the kind described comprising in combination with a furnace and smoke pipe, a smoke pipe section located adjacent the smoke outlet of the furnace and formed on its inner wall with longitudinal air passageways closed at their outer ends and open at their inner ends adjacent to the smoke outlet of the furnace, said air passageways being circumferentially arranged and spaced from each other to provide unobstructed passageways for the products of combustion flowing in an opposite direction to the flow of air in the air passageways, air inlets adjacent to the closed ends of the air passageways, means for controlling the intake of air and means for directing the air from the air passageways toward the axis of the smoke pipe section.

9. A device of the kind described for use with a heating plant having a flue outlet pipe comprising an elongated hollow body of substantially the same size throughout its length forming a part of said flue outlet pipe, said body having formed on its inner wall a plurality of inwardly projecting circumferentially arranged longitudinally disposed air conduits forming between them a plurality of circumferentially arranged unobstructed flue passageways, each air conduit being closed at one end and provided adjacent said closed end with an air inlet and at its other end with an outlet in communication with the interior of said body and means for controlling the admission of air to said air conduits.

10. A device of the kind described comprising a hollow body, said body having formed on its inner wall a plurality of inwardly projecting circumferentially arranged longitudinally disposed air conduits forming between them a plurality of circumferentially arranged unobstructed flue passageways, said flue passageways being substantially V-shaped in cross section, each air conduit being closed at one end and provided adjacent said closed end with an air inlet and at its other end with an outlet in communication with the interior of said body and means for controlling the admission of air to said air conduits.

11. A smoke pipe air check comprising a cylindrical casing having a plurality of annularly arranged pockets, said pockets being provided with air inlets at their outer ends and air outlets at their inner end and a collar surrounding said casing having a plurality of openings adapted to register with said pockets for allowing air to enter said pockets from the atmosphere, said collar having means for holding it in position under tension.

12. A device of the kind described comprising a casing having a plurality of openings, an inwardly extending pocket arranged over each of said openings, said pocket having a lateral outlet at one end, means surrounding said casing having openings registering with the openings therein and means for holding said last mentioned means in adjusted position under tension.

In testimony whereof I hereunto affix my signature.

RAYMOND J. JENKINS.